(12) United States Patent
Bell

(10) Patent No.: US 8,932,462 B1
(45) Date of Patent: Jan. 13, 2015

(54) OIL FILTER CONVERSION KIT

(71) Applicant: Desmond Bell, Killeen, TX (US)

(72) Inventor: Desmond Bell, Killeen, TX (US)

( * ) Notice: Subject to any disclaimer, the term of this patent is extended or adjusted under 35 U.S.C. 154(b) by 0 days.

(21) Appl. No.: 14/317,058

(22) Filed: Jun. 27, 2014

Related U.S. Application Data

(60) Provisional application No. 61/840,263, filed on Jun. 27, 2013.

(51) Int. Cl.
*B01D 35/30* (2006.01)
*B01D 27/08* (2006.01)
*B01D 35/34* (2006.01)
*F01M 11/03* (2006.01)

(52) U.S. Cl.
CPC ......... *F01M 11/03* (2013.01); *F01M 2011/031* (2013.01); *B01D 35/30* (2013.01); *B01D 27/08* (2013.01); *Y10S 210/17* (2013.01)
USPC .................................. 210/232; 210/DIG. 17

(58) Field of Classification Search
USPC .......................................... 210/232, DIG. 17
See application file for complete search history.

(56) References Cited

U.S. PATENT DOCUMENTS

| | | | |
|---|---|---|---|
| 2,886,180 A * | 5/1959 | Morgan et al. | 210/438 |
| 3,023,906 A * | 3/1962 | Moore | 210/484 |
| 5,374,355 A | 12/1994 | Habiger et al. | |
| 5,548,893 A * | 8/1996 | Koelfgen | 29/888.011 |
| 5,584,987 A | 12/1996 | Mules | |
| 6,110,365 A * | 8/2000 | Bartels et al. | 210/232 |
| 6,224,758 B1 | 5/2001 | Jainek et al. | |
| 6,227,381 B1 | 5/2001 | Koivula | |
| 6,387,259 B1 * | 5/2002 | Roll | 210/232 |
| 6,485,635 B1 * | 11/2002 | Gandini et al. | 210/117 |
| 6,499,605 B1 | 12/2002 | Koivula | |
| 2004/0065602 A1 * | 4/2004 | Moscaritolo et al. | 210/130 |

FOREIGN PATENT DOCUMENTS

DE           4036191 A1 *    2/1992

* cited by examiner

*Primary Examiner* — Thomas M Lithgow
(74) *Attorney, Agent, or Firm* — Daniel Boudwin; Global Intellectual Property Agency LLC

(57) ABSTRACT

An engine oil filter conversion assembly is provided for allowing a user to replace a standard canister oil filter with an assembly that facilitates removal and replacement of the internal paper filter element therein. The assembly comprises a housing similar to a canister oil filter, wherein the canister includes removably attached components such that the internal filter element is accessible, whereby the filter element can be replaced during an oil change instead of the complete canister. The purpose of the present invention is to reduce waste and allow the filter element only to be discarded, while facilitating quick access to the filter element and providing an assembly that can replace canister oil filters on modern internal combustion engines. The assembly comprises a baseplate, a louvered center tube, a removable filter element, a filter housing, a lower end seal and a joining fastener.

5 Claims, 2 Drawing Sheets

OIL FILTER CONVERSION KIT

CROSS REFERENCE TO RELATED APPLICATION

This application claims the benefit of U.S. Provisional Application No. 61/840,263 filed on Jun. 27, 2013, entitled "Oil Filter Conversion Kit." The above identified patent application is herein incorporated by reference in its entirety to provide continuity of disclosure.

BACKGROUND OF THE INVENTION

1. Field of the Invention

The present invention relates to combustion engine oil filters. More specifically, the present invention relates to a conversion kit that allows a user to replace canister style engine oil filters with a housing that supports a removable paper filter element, allowing the user to replace only the filter element during an oil change to reduce waste products during engine servicing.

Internal combustion engines require lubrication to reduce friction, prevent wear, and to maintain optimal performance of the mechanical assembly. Many surfaces are in contact with one another, therefore sufficient surface lubrication is necessary to ensure smooth operation. All vehicle owners and mechanics are accustomed to changing the oil of their vehicle's engine periodically during its useful life, which involves draining and replacing the engine oil, and also replacing the engine oil filter that filters particulates and solid material from within the oil as it is circulated through the engine. Oil filters prolong the life of the engine oil and are used to trap metal shavings, contaminants, and other debris from the oil as it circulates, in an attempt to maintain the cleanliness of the oil and therefore a stable lubricity and fluid viscosity.

Engine oil filters are known in the art and come in different forms. The first major type is the oil filter element type, in which a filter element or cartridge is removed from the engine and replaced during oil change maintenance intervals. Older vehicles deployed this technique, and even some newer generation vehicles have returned to this method as a means of reducing material waste during the oil change process. However, most modern vehicles employ the canister style oil filter assembly, which comprises an enclosed housing having a filter element therein, where the entire canister is threaded into position on the vehicle engine and the entire canister is discarded and replaced during an oil change. This type of oil filter is convenient and less messy to replace, however it is accompanied with a much larger environmental footprint. Replacing the entire canister means the canister and the element are discarded and replaced, wherein the older method of replacing just the filter element creates a waste product in the paper filter only.

Most vehicles have either one type of oil filter or another, without a means to switch between the filter element style and the canister style oil filter. The present invention provides a new and novel assembly that allows a vehicle equipped to support a canister style oil filter the option of retrofitting the present invention to allow replacement of the filter element alone. Specifically, the present invention is an oil canister assembly that includes a structure that separates such that access and removal of the filter element is facilitated such that replacement of the entire canister is not necessary.

The present invention comprises an oil canister housing having a removably attached baseplate, a removably attached lower end seal, an louvered center tube, a removably paper filter element, and a joining fastener that secures the lower end seal to the housing and encloses the filter element therein. The baseplate includes a seal member, an apertured surface to accept oil therethrough, and a central post that threadably attaches to the vehicle engine on one side and to the louvered center tube at the opposite side. The center tube allows oil to flow into the filter element, which is positioned thereover and pressed against the baseplate. The lower end seal is secured to the housing via the joining fastener, whereby the assembly can be broken down to first drain the oil and the retrieve and replace the filter element therein. Overall, the present invention provides consumers and mechanics with a convenient means of retrofitting a standard canister oil filter with one that produces less waste products during an oil change procedure.

2. Description of the Prior Art

Devices have been disclosed in the prior art that relate to assemblable oil filters and those that support removable filter elements. These include devices that have been patented and published in patent application publications. The following is a list of devices deemed most relevant to the present disclosure, which are herein described for the purposes of highlighting and differentiating the unique aspects of the present invention, and further highlighting the drawbacks existing in the prior art.

Such devices include U.S. Pat. Nos. 6,227,381 and 6,499,605 to Koivula, which disclose a spin-on oil filter that comprises a casing with an openable end. The casing is removable to access the filter and remove the same, wherein the filter is attached to a collar that connects to the vehicle engine and allows engine oil to enter therethrough. This assembly permits the user to remove the filter element by removing the outer casing; however it is structured such that the entire casing must be removed first, whereby oil within the casing cannot first be drained, and furthermore the entire casing must be removed to facilitate removal of the filter element. While fulfilling a similar purpose, the structure and the configuration of the Koivula device diverges from that of the present invention, which provides a housing having a removable lower end seal and a threadably attached baseplate attaching to the vehicle engine. The present invention adds greater flexibility with regard to draining the oil and then accessing the filter therein.

U.S. Pat. No. 5,374,355 to Habiger an oil filter having a base plate that can be fastened to a threaded nipple, a cover that is releasably fastened to the base plate, and a support tube disposed on the cover or base plate. The filter element is placed over the support tube. The filter cartridge is in contact with a seal on the base plate and an additional seal on the cover. The device of Habiger allows one to replace the filter element alone, as provided herein. However, the present invention includes a removable lower end seal as well as a removable baseplate, both of which are secured to the oil canister housing to form an enclosed volume secured by the securing fastener. The present invention offers greater flexibility and allows the user to neatly drain the filter housing before opening the same and retrieving the filter element therefrom.

U.S. Pat. No. 5,584,987 to Mules discloses an oil filter assembly that supports a removable filter element that is attached by a screw-thread attachment at the opening of the oil filter body. The oil filter body supports the oil filter element herein, wherein the element is replaceable. A base supports an elongated tube supporting the filter element, wherein the base is attached to the body. Similar to the Habiger and Koivula devices, the Mules device fails to offer the ability to separate the housing of the oil filter canister as provided herein, or with the ability to drain the housing prior to separation of the housing from the baseplate or from the engine.

Still other devices in the art include U.S. Pat. No. 6,224,758 to Jainek and U.S. Pat. No. 5,548,893 to Koelfgen. These devices, as with the aforementioned devices, do not provide an oil filter assembly having a housing support a removable baseplate, end seal and a removable center post. Furthermore, these devices do not allow the engine oil to be drained prior to removing the filter housing, which can be an unnecessary mess. The present invention supports a securing fastener that acts as a drain nut prior to removing the housing from the baseplate to access the removable filter element.

The present invention provides an oil filter assembly that is completely disassemblable, whereby the housing of the assembly connects to a removable baseplate and end seal, while the filter element is secured therein and removable after the sealing fastener is removed and the engine oil is drained from the assembly. In this way, the present invention provides a novel means of replacing the canister style oil filter of an internal combustion engine. It is submitted that the present invention is substantially divergent in design elements from the prior art, and consequently it is clear that there is a need in the art for an improvement to existing oil filter devices. In this regard the instant invention substantially fulfills these needs.

SUMMARY OF THE INVENTION

In view of the foregoing disadvantages inherent in the known types of oil filter assemblies now present in the prior art, the present invention provides a new oil filter assembly that can be utilized for providing convenience for the user when retrofitting a removable filter element style filter for a canister style filter element on a vehicle engine.

It is therefore an object of the present invention to provide a new and improved oil filter assembly that has all of the advantages of the prior art and none of the disadvantages.

It is another object of the present invention to provide an oil filter assembly that can be used as a replacement for a canister oil filter for an internal combustion engine, wherein the assembly allows the user to replace only the internal filter element and not replace an entire canister every oil change interval.

Another object of the present invention is to provide an oil filter assembly that secures to an engine in the same fashion as a canister oil filter but provides a means of separation such that the internal filter element can be accessed, removed, and replaced.

Yet another object of the present invention is to provide an oil filter assembly that comprises a construction that allows the user to first drain the filter assembly of oil prior to disassembly and prior to replacing the filter element therein.

Another object of the present invention is to provide an oil filter assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
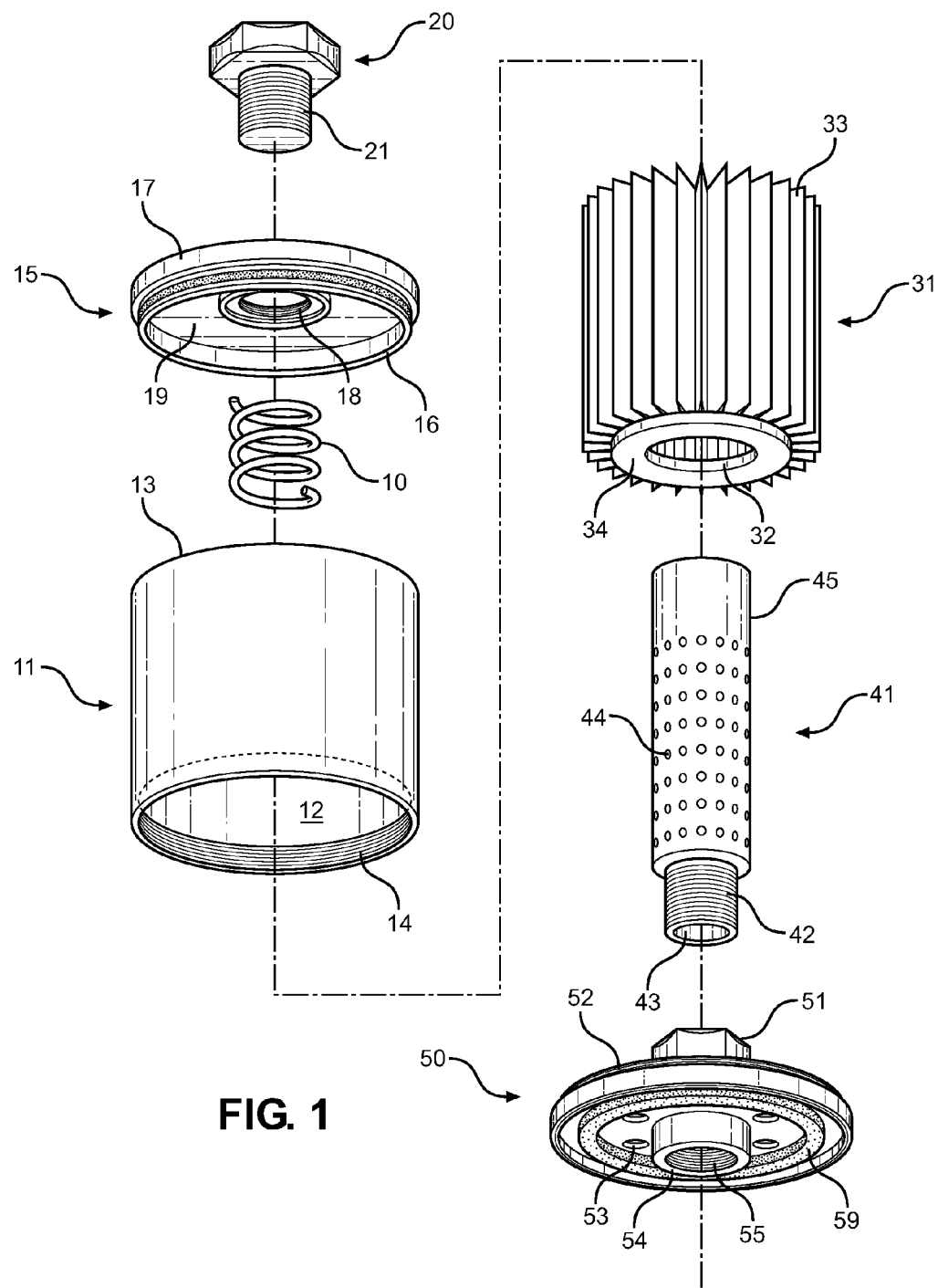
FIG. 1 shows an exploded view of the oil filter assembly of the present invention.

Reference is made herein to the attached drawings. Like reference numerals are used throughout the drawings to depict like or similar elements of the oil filter assembly of the present invention. For the purposes of presenting a brief and clear description of the present invention, the preferred embodiment will be discussed as used for replacing canister style oil filters and allowing a user to replace only the internal filter element of the oil filter during each oil change interval. The figures are intended for representative purposes only and should not be considered to be limiting in any respect.

Referring now to FIG. 1, there is shown an exploded view of the oil filter assembly of the present invention, illustrating its constituent elements. The oil filter assembly is one that supports a removable filter element 31 within a housing 11 such that a user or mechanic can remove and replace the filter element 31 only when changing engine oil, as opposed to discarding an entire oil filter canister. The assembly comprises a housing 11 having a hollow interior 12 and a tubular design. The housing 11 comprises a first end 13 and a second end 14, whereby the ends are adapted to connect to the lower end seal 15 and the baseplate 50 to enclose the filter element 31 therein.

The baseplate 50 is a member having an outer surface adapted to mate against a vehicle engine and receive engine oil therethrough, and an inner surface adapted to be positioned within the interior of the housing 11. Through the baseplate is a plurality of oil inlet apertures 53 for allowing oil to flow freely into the housing 11 and through the filter element 31. Oil pressure moves the oil through the filter element 31 and into a louvered center tube 41, which receives the filtered oil and allows the oil to escape the filter assembly through the central aperture 55 in the baseplate 50. The central aperture 55 acts as a return for oil to enter back into the engine for recirculation through the lubrication system. This filtration cycle is well understood in the art and the same means deployed by canister-style filters in the art. The present invention adds deconstructability to the art by providing an assembly that can be disconnected to first drain the filter assembly of oil, and then remove and replace the filter element 31.

The baseplate 50 comprises an upstanding ring 52 having a threaded outer surface. The threaded ring 52 is disposed along the inner surface of the baseplate and is adapted to threadably attach to the second end 14 of the housing 11, which comprises interior surface threading. This allows the baseplate 50 to threadably engage the housing second end 14 and effectuate a removable attachment therebetween. Further present along the inner surface of the baseplate 50 is an upstanding member 51 that is adapted to threadably engage the center tube 41. The upstanding member 51 is a threaded member having interior threads and an open interior forming the central aperture 55 of the baseplate.

The exterior of the member 51 comprises a hexagonal or similarly faceted shape, whereby a user can obtain purchase of the baseplate 50 by this member using a socket wrench or box end wrench. This allows the user to release the baseplate 50 from an engine if the baseplate 50 has fused or is adhered thereto over a period of usage. Once the housing 11 and center tube 41 are removed, this upstanding member 51 forms a nut upon which a tool can be attached to remove the baseplate 50 from the engine if hand loosening is not sufficient to break its seal.

Disposed along the outer surface of the baseplate and surrounding the oil inlet apertures 53 is a gasket 59 or seal, which is a flexible membrane that prevents leakage once the baseplate is attached to the engine. To secure the baseplate 50, the threaded central aperture 55 engages a male threaded spigot disposed along the engine. The threaded spigot is the attachment of the oil filter and is used to support the oil filter assembly and facilitate oil flow from the filter during engine usage.

Securing to the baseplate threaded member 51 is a louvered center tube 41, which is an elongated and tubular member having a male threaded end 42, a female threaded end, a hollow interior 43, and a rounded and apertured sidewall 45. The center tube 41 is mounted centrally and longitudinally through the housing 11, and supports the filter element 31 by engaging the same through its central aperture 32. The apertures 44 disposed along the center tube 41 allow oil that has passed through the filter element 31 to enter the tube interior 43 and be forced through the baseplate central aperture 55 and back into the engine. The oil is under pressure and the central tube 41 receives the filtered oil and prevents the same from contacting oil that has yet to be filtered within the interior of the housing 11.

The female threaded end of the center tube 41 is adapted to receive the threaded end 21 of a joining fastener 20 at one end of the assembly. The joining fastener 20 is one that is positioned through an aperture 18 in the lower end seal 15 of the assembly, wherein the fastener 20 threadably engages the center tube and can be torqued into position. This sandwiches the lower end seal 15 against the first end 13 of the housing 11 and encloses the filter element 31 within the interior thereof.

The lower end seal 15 of the present invention is an end cap member that seals the first end 13 of the housing 11 and supports the fastener 20 and a filter spring 10. The lower end seal 15 comprises a rounded surface having a ledge 16, the ledge being insertable into the interior of the housing 11 along its first end 13. Along the outer surface of the ledge is a gasket or seal member, which prevents oil from escaping between the ledge 16 and the housing 11 at the end of the assembly during use. The inner surface 19 of the lower end seal 15 supports a coil spring 10, which is used to bear against the upper end of the filter element 31 and retain its position within the housing 11 as oil is forced into the assembly. Along the outer surface 17 of the lower end seal 15, the joining fastener 20 is inserted therethrough and bears thereagainst when the assembly is joined and the filter element 31 is replaced.

The filter element 31 is a replaceable member comprising a paper filter or similar material filter used to remove contaminates and particulates from engine oil. Its construction is preferably one of a corrugated 33 construction that increases its surface area relative to its circumference and length. The construction of the filter may take on many forms, wherein removable filters common in the art may be deployed using the present assembly for filtering the engine oil. The filter element comprises a central aperture 32 extending therethrough, forming a hollow interior to accept the center tube 41 therein. Finally, the filter element 31 comprise a first end 34 that bears against the baseplate 50 and a second end that bears against the coil spring 10 pressing thereagainst.

Figure 2:
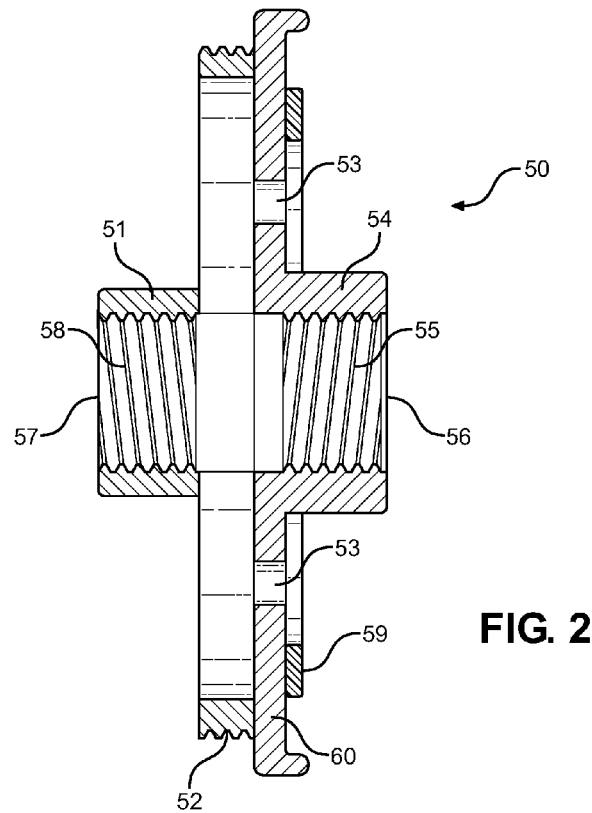
FIG. 2 shows a cross section view of the baseplate of the present invention.

Referring now to FIG. 2, there is shown a cross section view of the baseplate 50 of the present invention. As illustrated, the baseplate 50 comprises a surface 60 having a central aperture 55 and a plurality of oil inlet apertures 53 extending therethrough. The central aperture 55 acts as a conduit for filtered oil to return to the vehicle engine after being filtered. Oil inlet apertures 53 are disposed along the flat surface 60 to allow oil from the engine to enter the filter housing and be filtered by the filter element.

The interior side of the baseplate 50 comprises an upstanding ring 52 having a threaded outer surface, whereby the ring 52 secures to the first end of the housing. Further disposed along the interior side of the baseplate 50 is an upstanding member 51 having a threaded interior surface 58 and an open upper 57 forming the first end of the central aperture 55. Opposite of the baseplate along its exterior side is a second upstanding member 54 that has a female threaded interior surface such that the baseplate 50 can be secured to a male threaded spigot of a vehicle engine. The thread directions of the first upstanding member 51 and the second upstanding member 54 are preferably opposite in direction, whereby the center tube is secured by threadably attached in one direction, while the baseplate is threadably attached to the male threaded spigot in an opposite direction. Similarly, the housing threadably attaches in an opposite direction with respect to the second upstanding member 51 such that the user can remove the housing without releasing the baseplate 50. Furthermore, the joining fastener is threaded oppositely of the second upstanding member 54 of the baseplate, whereby the user can loosen the sealing fastener to drain the oil from the filter before releasing the baseplate and the entire housing. The user can therefore release the fastener, drain the oil and replace the filter element without removing the baseplate or breaking the seal 53 between the engine and the baseplate, if desired.

Figure 3:
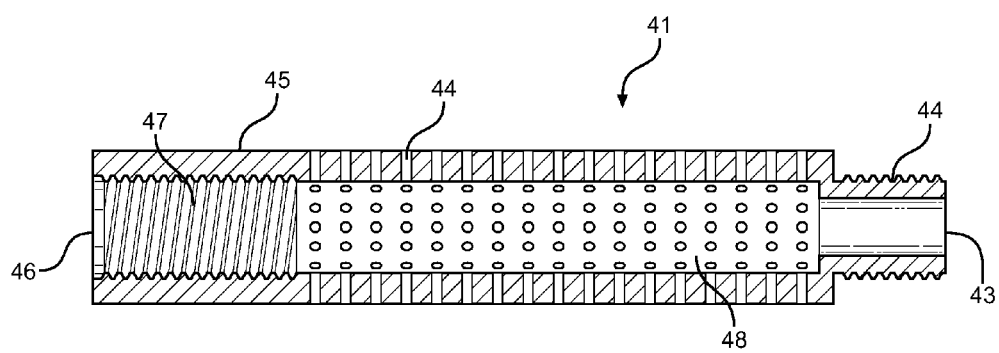
FIG. 3 shows a view of the louvered center post of the present invention.

Referring now to FIG. 3, there is shown a cross section view of the center tube 41 of the present invention. As illustrated, the center tube 41 is an elongated member having a hollow interior 48, a male threaded first end 42 and a female threaded second end 46. The female threaded end 46 comprises internal threads 47 to receive the fastener, while the male threaded end 44 is secured to the baseplate. The hollowing interior 48 receives filtered oil through apertures 44 along its sidewall 45, whereafter the oil flows through the opening 43 along the male threaded end and into the engine lubrication system.

Vehicles need the oil and oil filter changed regularly to maintain optimal performance. An oil filter operates to remove contaminants from the motor oil so that the oil flows smoothly and cleaner throughout the vehicle. Clean oil maintains optimal performance of the vehicle and ensures mechanical longevity as well. A vehicle oil filter is comprised of a cylindrical shaped paper like filter that is contained within a metal frame. Each time an oil filter is changed, both the filter and the metal housing are discarded. Since oil changes are required multiple times in a calendar year this process can become expensive and wasteful. The present invention provides a new and useful oil filter assembly that has several components that are fastened together to form an enclosed canister, while providing access to the internal filter element therein such that the filter element along can be removed and discarded during an oil change.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An oil change assembly, comprising:
a housing having an open first end, an open second end, and a hollow interior;
said housing sized to receive an oil filter element therein;
a lower end seal sized to secure over said open first end and having an aperture therethrough to receive a joining fastener;
a baseplate comprising a central aperture and a plurality of oil inlet apertures extending therethrough, an inner side, an outer side;
said inner side comprising a threaded ring for threadably securing to said open second end of said housing;
said inner side further comprising a first upstanding member having an open interior aligned with said central aperture and a threaded interior surface;
said outer side further comprising a second upstanding member having an open interior aligned with said central aperture and a threaded interior surface;
a center tube having an elongated length, a tubular sidewall with an open interior, a female threaded end, a male threaded end;
said tubular sidewall having a plurality of apertures disposed therethrough;
said female threaded end adapted to threadably receive said joining fastener;
said male threaded end adapted to threadably engage said first upstanding member;
a filter element having an open interior sized to receive said center tube.

2. The oil change assembly of claim 1, further comprising a coil spring disposed between said lower end seal and said filter element.

3. The oil change assembly of claim 1, wherein:
said joining fastener comprises a thread direction opposite of said threaded interior surface of said second upstanding member.

4. The oil change assembly of claim 1, wherein said lower end seal further comprises a ledge supporting a seal thereon.

5. The oil change assembly of claim 1, wherein said first upstanding member further comprises a faceted exterior surface adapted to receive a wrench tool.

* * * * *